US011261343B2

(12) United States Patent
Kohler et al.

(10) Patent No.: US 11,261,343 B2
(45) Date of Patent: Mar. 1, 2022

(54) COATING AGENT AND ITS USE

(71) Applicant: STAEDTLER MARS GMBH & CO. KG, Nuremberg (DE)

(72) Inventors: Annette Kohler, Nuremberg (DE); Christa Lehrer, Neumarkt (DE)

(73) Assignee: STAEDTLER MARS GMBH & CO. KG, Nürunberg (DE)

( * ) Notice: Subject to any disclaimer, the term of this patent is extended or adjusted under 35 U.S.C. 154(b) by 141 days.

(21) Appl. No.: 16/481,750

(22) PCT Filed: Jan. 5, 2018

(86) PCT No.: PCT/EP2018/050256
§ 371 (c)(1),
(2) Date: Jul. 29, 2019

(87) PCT Pub. No.: WO2018/141500
PCT Pub. Date: Aug. 9, 2018

(65) Prior Publication Data

US 2020/0002562 A1 Jan. 2, 2020

(30) Foreign Application Priority Data

Feb. 3, 2017 (DE) .................... 10 2017 001 234.2

(51) Int. Cl.

| | |
|---|---|
| ***C09D 101/00*** | (2006.01) |
| ***C09D 101/18*** | (2006.01) |
| ***C09D 7/63*** | (2018.01) |
| ***A45D 40/20*** | (2006.01) |
| ***B43K 19/14*** | (2006.01) |
| ***B43K 23/008*** | (2006.01) |
| ***C09D 101/14*** | (2006.01) |
| *C08K 3/013* | (2018.01) |
| *C08K 5/00* | (2006.01) |
| *C08K 5/5435* | (2006.01) |
| *C08L 77/00* | (2006.01) |

(52) U.S. Cl.
CPC .......... *C09D 101/18* (2013.01); *A45D 40/20* (2013.01); *B43K 19/14* (2013.01); *B43K 23/008* (2013.01); *C09D 7/63* (2018.01); *C09D 101/14* (2013.01); *C08K 3/013* (2018.01); *C08K 5/0016* (2013.01); *C08K 5/5435* (2013.01); *C08L 77/00* (2013.01)

(58) Field of Classification Search
None
See application file for complete search history.

(56) References Cited

U.S. PATENT DOCUMENTS

| | | | | |
|---|---|---|---|---|
| 4,490,415 | A * | 12/1984 | Imamura | B05D 7/20 401/49 |
| 5,662,891 | A | 9/1997 | Martin | |
| 7,993,439 | B2 * | 8/2011 | Kaeppler | C09D 11/03 106/31.33 |
| 2011/0274633 | A1 * | 11/2011 | Vu | C09D 133/14 424/61 |
| 2013/0157020 | A1 * | 6/2013 | Crandon | C08K 5/57 428/201 |

FOREIGN PATENT DOCUMENTS

| | | | |
|---|---|---|---|
| CN | 102746747 | A | 10/2012 |
| DE | 29908890 | U1 | 2/2000 |
| DE | 69628823 | T2 | 5/2004 |
| EP | 1300451 | A2 | 4/2003 |
| JP | 2007246605 | A | 9/2007 |
| SU | 621708 | A | 8/1978 |

OTHER PUBLICATIONS

Database WP Week 200826 Thomson Scientific, London, GB; AN 2008-060422 XP002779264.
Database WP Week 201356 Thomson Scientific, London, GB; AN 2013-B14536 XP002779265.
Database WP Week 197926 Thomson Scientific, London, GB; AN 1979-48559B XP002779266.

* cited by examiner

*Primary Examiner* — Stefanie J Cohen
(74) *Attorney, Agent, or Firm* — Lucas & Mercanti, LLP; Klaus P. Stoffel

(57) ABSTRACT

A coating agent for pencils for writing, sketching or drawing or for cosmetic articles of all kinds, including at least one cellulose fraction, at least one binder, at least one plasticizer, and at least one adhesion promoter, wherein the adhesion promoter is designed as a silane having functional groups.

5 Claims, No Drawings

COATING AGENT AND ITS USE

CROSS-REFERENCE TO RELATED APPLICATIONS

The present application is a 371 of International application PCT/EP2018/050256, filed Jan. 5, 2018, which claims priority of DE 10 2017 001 234.2, filed Feb. 3, 2017, the priority of these applications is hereby claimed and these applications are incorporated herein by reference.

BACKGROUND OF THE INVENTION

The invention relates to a coating agent and its use.

Coating agents and coatings produced therewith are known in principle. In the following, coatings are understood as meaning immersion caps, rulings and/or complete coatings.

For example, so-called NC lacquer systems are known, which are used for coating or lacquering the surfaces of wood-cased pencils or their shafts.

Known NC lacquer systems for wood-cased pencils consist predominantly of colored or colorless nitrocellulose lacquer, Solvents such as ketones, alcohols or acetates are used for the rapid drying of such coatings. Such coating agents optionally have dispersed pigments, fillers and further additives.

A disadvantage found in such NC lacquer systems is that extruded pencils having shafts based on WPC and/or plastic can not be coated or only poorly or only with difficulty. The coatings on the shafts produced with known NC lacquer systems are poor in adhesion and peel off easily.

A coating agent and system known to improve the haptic sensations is further known from DE 299 08 890 U1, which are provided to be used for the handling surface with gripping surfaces or grip nubs forming raised structures made of plastic material.

The disadvantage here is that such lacquer systems do not wet cleanly on extruded pencils having shafts of WPC and/or plastic in the liquid state and do not sufficiently adhere in the solidified state.

A further known option for coating is the technology in which shafts can be provided completely or in some subregions, such as with so-called immersion caps on the pencil ends.

Although the adhesion problem can indeed be reduced here, the method for applying such films is expensive and requires much effort in terms of process.

SUMMARY AND DESCRIPTION OF THE INVENTION

It is therefore an object of the present invention to propose a coating agent in order to provide a coating which avoids the above disadvantages and, in particular, ensures a good adhesion for coatings on shafts made of WPC and/or plastic. It is a further object of the invention to give the coated articles a high-quality or enduring high-quality appearance.

Preferred fields of application include the surface coating of writing, drawing or painting devices or for cosmetic products of all kinds, whose shaft material contains WPC and/or plastics.

It has surprisingly been found that, by means of the coating agent, extruded pencils having shafts made of WPC and/or plastics can be completely coated and/or partially coated and that the coatings have a very good adhesion to the substrate. Immersion caps, rulings and/or full-surface coating/lacquering would cited as examples of coatings.

Preferred uses of the solution according to the invention are coatings or surface overlays such as immersion caps, rulings and/or full-surface lacquerings of writing, drawing, painting or cosmetic devices of all kinds.

The object could be achieved with a coating agent for pencils for writing, drawing or painting or for cosmetic products of all kinds, at least consisting of at least one cellulose fraction, at least one binder, at least one plasticizer and at least one adhesion promoter, wherein the adhesion promoter is formed as a silane having functional groups.

The content of adhesion promoter in the coating agent according to the invention is in the range of 1 to 8% by weight.

Silane in the following is understood as meaning organofunctional silanes, in particular epoxy-functional silanes, a bridge former between organic polymers and inorganic materials.

Such silanes enable a better adhesion of NC lacquer coatings on a critical substrate, such as WPC and/or plastic.

The solution according to the invention is shown in more detail below based on some examples.

Here, the stated quantities are percentage individual values, which may vary in part within the scope of the processability and the desired end properties, as well as the mutual compatibilities.

FRAMEWORK EXAMPLE COATING AGENT

| | |
|---|---|
| Cellulose component | 8 to 22% by weight |
| Solvent | 58 to 77% by weight |
| Co-binder | 4 to 11% by weight |
| Binder | 2 to 7% by weight |
| Plasticizer | 3 to 9% by weight |
| Adhesion promoter | 1 to 8% by weight |
| Colorant | 0 to 14% by weight |

FORMULATION EXAMPLE 1: COLORLESS COATING AGENT

| | |
|---|---|
| Nitrocellulose chips with plasticizer fraction | 13% by weight |
| Ethyl acetate (solvent) | 66% by weight |
| Cellulose acetobutyrate (Co-BM) | 8.5% by weight |
| Polyamide resin (binder) | 4% by weight |
| Epoxidized soybean oil (plasticizer) | 6.5% by weight |
| Epoxy-functional sane (adhesion promoter) | 2% by weight |

FORMULATION EXAMPLE 2: WHITE COATING AGENT

| | |
|---|---|
| Nitrocellulose chips with plasticizer fraction | 9% by weight |
| Ethanol (solvent) | 68% by weight |
| Cellulose acetobutyrate | 6.0% by weight |
| Polyamide resin (binder) | 3% by weight |
| Epoxidized soybean oil (plasticizer) | 5% by weight |
| Epoxy-functional silane (adhesion promoter) | 4% by weight |
| Carbon black (colorant) | 5% by weight |

The cellulose fraction is present in the solution according to the invention as nitrocellulose in the form of nitrocellulose chips with plasticizer fraction as peileted nitrocellulose and/or in phlegmatized, moistened form. Water, butanol, ethanol or isopropanol serve as a moistening agent.

The content of the cellulose component in the coating agent is 8 to 22% by weight.

For example, ketones, acetates and/or alcohols can be used as solvents. Examples which may be cited are ethyl acetate, butanol, isopropanol and/or ethanol. Here, the content of solvent in the agent is between 58 to 77% by weight.

Binders can be present, exemplified as polyimide resin, ketone resin, acrylate resin and/or formaldehyde resin.

In general, binders which are soluble in the respective solvents can be used. The binder is present in a content of binder 2 to 7% by weight in the coating agent.

The co-binder added to the coating agent in an amount of 4 to 11% by weight has the task of adjusting the flexibility/brittleness of the coating agent and thus coatings produced therewith. Examples which may be cited are cellulose acetobutyrate, cellulose acetoproprionate, cellulose acetate and/or polyacrylates, such as styrene acrylate.

Examples of plasticizers used in the binder are epoxidized soybean oil, alkonsulfonic add esters and/or polyol esters and are present in a content of 3 to 9% by weight.

The colorants (f) can be present as a pigment preparation, organic color pigments and/or inorganic pigments. Examples of inorganic pigments which may be cited are carbon black and titanium dioxide. If colorants are used, they can be present up to a content of 14% by weight.

The coating agent described above is used for surface coatings and immersion caps for writing, drawing or painting devices or for cosmetic products of all kinds.

The devices, articles are available as extruded pencils based on WPC (wood plastic compounds) and/or plastic. Here, the at least one base polymer in WPC and/or plastic is formed as polypropylene (PP), polyethylene (PE), polyamide (PA), polyacrylate, polyurethane (PU), thermoplastic polymers (TPE) and/or polyvinyl chloride (PVC).

The colored and/or colorless coating agent is usually applied according to conventional coating technology on the objects to be coated in one or more layers and dried. These methods have long been used in the coating of wood-cased pencils/shafts. These are the immersion and polishing methods.

The invention claimed is:

1. A pencil, comprising: a shaft made of extruded WPC (wood plastic compounds); and a coating on at least a portion of the shaft, wherein the coating includes a coating agent comprising: at least one cellulose fraction; at least one binder; at least one plasticizer; and at least one adhesion promoter; wherein the adhesion promoter is a silane having functional groups, wherein the silane is an organofunctional silane.

2. The pencil according to claim 1, wherein the silane is an epoxifunctional silane.

3. The pencil according to claim 1, wherein a content of the silane in the coating agent is 1 to 8% by weight.

4. The pencil agent according to claim 1, wherein the cellulose fraction includes nitrocellulose in the form of nitrocellulose chips with plasticizer fraction; as pelleted nitrocellulose; or in phlegmatized, moistened form, or combinations thereof.

5. The pencil according to claim 1, wherein the agent is composed essentially of

| | |
|---|---|
| cellulose fraction | 8 to 22% by weight |
| solvent | 58 to 77% by weight |
| co-binder | 4 to 11% by weight |
| binder | 2 to 7% by weight |
| plasticizer | 3 to 9% by weight |
| adhesion promoter | 1 to 8% by weight |
| colorant | 0 to 8% by weight. |

* * * * *